Aug. 26, 1924.
F. H. FREDETTE
BATTERY FILLER
Filed May 11, 1920
1,506,172
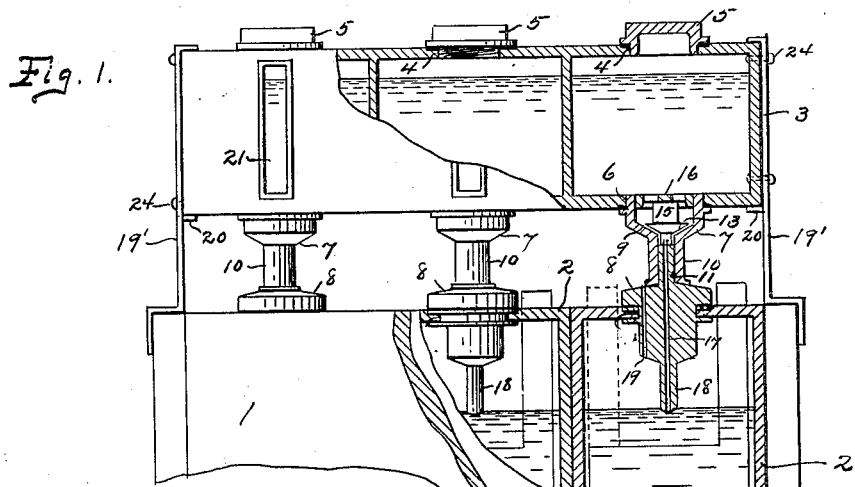
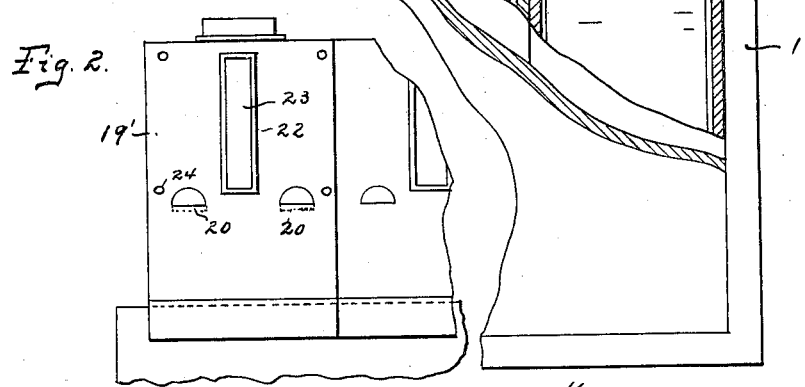
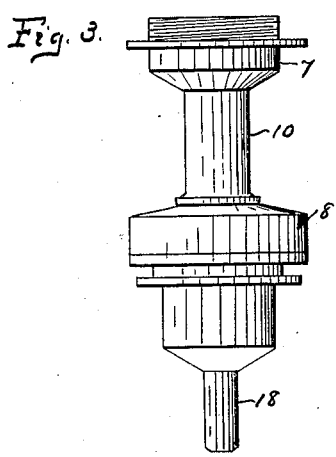
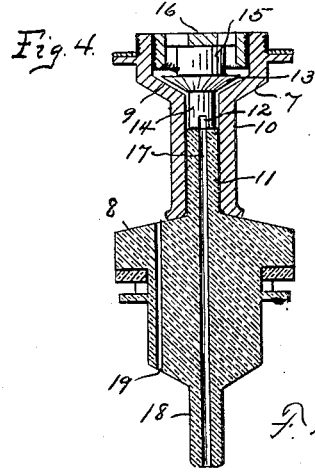
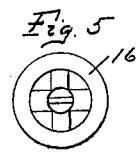
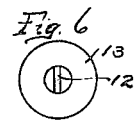
F. H. Fredette
INVENTOR.
BY
Louis M. Sanders ATTORNEYS.

Patented Aug. 26, 1924.

1,506,172

UNITED STATES PATENT OFFICE.

FRANK H. FREDETTE, OF NEWARK, NEW JERSEY, ASSIGNOR, BY MESNE ASSIGN-
MENTS, TO LOUIS CASSINELLI, OF NEWARK, NEW JERSEY.

BATTERY FILLER.

Application filed May 11, 1920. Serial No. 380,448.

*To all whom it may concern:*

Be it known that I, FRANK H. FREDETTE, a citizen of the United States, residing in the city of Newark, county of Essex, and State of New Jersey, have invented a new and useful Improvement in Battery Fillers, of which the following is a specification.

My invention relates to a storage battery accessory, and has for its object the provision of a distilled water tank superposed upon the top of a storage battery case, with connections from said tank to each of the battery cells whereby upon fixing the tank in its place, communication is automatically opened to permit the flow of water from the tank and maintain a uniform level in the several cells of the battery. It is well known that in use, the battery fluid will evaporate, and if not replenished, the plates will become exposed and rapidly deteriorate or be completely ruined. Constant attention is necessary, and since such batteries are in extensive use upon automobiles where they are usually placed in some inaccessible part of the machine, this frequent attention and replacing of the distilled water becomes irksome. With ordinary use, the cells should be replenished once in ten days or two weeks; if not, the efficiency of the battery is affected and possibly the whole battery ruined.

With my device, a single filling of the tank is usually sufficient to keep the battery supplied with distilled water for several months; and since it is automatic, the battery level is constant.

In the accompanying drawings forming a part of this specification,

Fig. 1 is a side elevation, partly in section, of a 3-cell storage battery, with a 3-cell water tank superposed thereon.

Fig. 2 is a fragmentary view, showing individual tanks for each battery cell.

Fig. 3 is a detached side elevation of the valve connection between the tank and the cell.

Fig. 4 is a vertical section of the same.

Fig. 5 is a top plan of the valve cap.

Fig. 6 is a bottom plan view of the valve.

Similar reference numerals refer to like parts throughout the specification and drawing.

The battery case 1 is ordinarily a wooden box of a size and shape to contain a plurality of storage battery cells, as 2. I have shown a case containing three such cells. It is not deemed necessary to describe the details of the cells, since they form no part of my present invention, except so far as they are essential to make up a complete operative combination. Immediately above the case 1, is the tank 3, divided into as many compartments as there are cells in the battery. Each compartment has the top opening 4, to receive the screw-threaded cap 5, and the bottom opening 6, screw-threaded to receive the valve case 7. The openings 7 are so located as to be in vertical alignment with the cell caps 8 and register therewith, when the tank is in place.

The valve case 7 is provided with an interior seat 9, and the tubular stem 10, which latter takes over the upwardly projecting stem 11 from the cell cap 8. The valve 13 is of conical form and is provided with a guiding stem 14, which extends a short distance into the tubular stem 10. Secured to the upper face of the valve 13 is a cylinder of soft rubber 15, which serves as an elastic backing for the valve. The upper end of the case 7 is closed by the cap 16, screwed down just into contact with the cylinder 15 when the valve 13 is upon its seat 9. In this manner, I form a very cheap but effective check valve for the tank, which prevents the escape of its contents so long as the valve is seated.

The cell cap 8, as above set forth, has the upwardly extending stem 11, which projects into the tubular stem 10 to a distance sufficient to contact with the valve stem 14, and when the tank is pressed down into its proper position, so as to bring the lower end of the stem 10 into airtight contact with the upper face of the cap 8, the valve 13 will be unseated, and thus open the passage through the valve case to the small passage 17, which extends through the stem 11, cap 8 and through the lower stem 18, which latter is integral with the cap 8, and extends to the liquid level of the cell. The cap 8 is also provided with a vent 19, by means of which the interior of the cell is kept at atmospheric pressure. The lower end of the stem 14 is provided with a cross slot 12 which registers with the upper end of the passage 17, so that a free passage is formed when the valve is unseated, from the tank 3 to the cell 2.

The tank 3 is supported upon the upper edge of the battery case 1, by means of the brackets 19', which are made of sheet metal as shown, and provided with struck out lugs 20, upon which the bottom of the tank 3 rests. The front of the tank is further provided with the windows 21, through which the height of the water within the several compartments of the tank may be observed.

If desired, the tank 3, instead of being divided into compartments, may be divided into separate or individual tanks, one for each of the battery cells, as illustrated in Fig. 2; in this case, the brackets 19' are located at the front and back of tanks instead of at the ends, as shown in Fig. 1. The front bracket 19' may have a cut-out portion as at 22, to register with the window 23. Any convenient method may be employed for securing the brackets to the tank, as for example they may be riveted as at 24.

When the tank or the tank compartments are to be filled, the tank is removed and the caps 5 are removed, when, of course, the water may be poured into the tank; the removal of the tank will remove the pressure upon the lower ends of the valve stems 14, permitting the rubber spring 15 to expand and forcibly seat the valve 13, thus preventing the escape of any of the water during the filling of the tank.

In operation, when the filled tank is placed in position, the water will trickle down through the valve passage from the tank into the cell, bubbles of air rising at the same time to take its place in the tank. This will continue until such time as the liquid level in the cells rises to cover the lower end of the passage 17, when the flow will cease. Whenever the liquid in the cell evaporates so as to uncover the passage 17, the flow will again start, and thus the operation becomes automatic.

In order that the battery chemicals shall not deteriorate the tank or its connections, I find it best to make all of the parts of vulcanized rubber, though any material which will not be attacked by the chemicals or battery gases will serve the purpose fully as well.

The improvement may be of sizes and dimensions to fit existing forms of batteries, or where the conditions permit, the brackets 19 may be permanently secured to the battery case, and a suitable means provided for mounting the tank upon the upper end of the brackets. These and other slight changes may be adopted without departing from the spirit and scope of my invention.

I claim:—

1. In combination with a plurality of storage battery cells, a filler tank having a plurality of closed compartments therein, separable tubular connections between the respective bottoms of said compartments and said cells respectively, each of said connections comprising a valve case fitted to an opening in the bottom of the compartment and having an elongated tubular discharge stem and a cell cap having an elongated tubular stem extending from the normal liquid level in said cell to a point within said discharge stem, a valve yieldingly held upon its seat within each case and each valve adapted to be unseated by the insertion of said cap stems into said discharge stems in placing said tank in position, whereby the valves in the several cases are simultaneously seated by the removal of said tank from said cells.

2. In combination with a storage battery cell, a closed filler tank adapted to be supported upon and above said cell, a separable tubular connection between the bottom of said tank and the top of said cell, comprising a valve case fitted to an opening in the bottom of said tank and having an elongated tubular discharge stem, and a cell cap having an elongated tubular stem extending from the normal liquid level in said cell to a point within said discharge stem, and a valve yieldingly held upon its seat within said case and adapted to be unseated as and when said cap stem is inserted into said discharge stem in placing said tank in position, and whereby said valve is automatically seated by the removal of said tank from said cell.

FRANK H. FREDETTE.